United States Patent [19]

Pfitzenmaier

[11] Patent Number: 5,512,520

[45] Date of Patent: Apr. 30, 1996

[54] IVORY COLOR IN OPAQUE GLASS-CERAMIC

[75] Inventor: Robert W. Pfitzenmaier, Canisteo, N.Y.

[73] Assignee: Corning Incorporated, Corning, N.Y.

[21] Appl. No.: 338,440

[22] Filed: Nov. 14, 1994

[51] Int. Cl.$^6$ .......................... C03C 10/12; C03C 10/14; C03C 3/085

[52] U.S. Cl. ..................... 501/7; 501/4; 501/64; 501/68; 501/69

[58] Field of Search .................. 501/7, 4, 64, 68, 501/69, 71

[56] References Cited

U.S. PATENT DOCUMENTS

| | | | |
|---|---|---|---|
| 1,726,635 | 9/1929 | Taylor | 501/64 |
| 2,683,666 | 7/1954 | Duncan et al. | 501/64 |
| 2,920,971 | 1/1960 | Stookey | 106/39 |
| 3,157,522 | 11/1964 | Stookey | 106/52 |
| 3,788,865 | 1/1974 | Babcock et al. | 106/39.7 |
| 4,336,303 | 6/1982 | Rittler | 428/334 |
| 4,461,839 | 7/1984 | Rittler | 501/4 |
| 4,977,110 | 12/1990 | Amundson, Jr. et al. | 501/7 |
| 5,070,045 | 12/1991 | Comte et al. | 501/4 |
| 5,173,453 | 12/1992 | Beall et al. | 501/4 |
| 5,256,602 | 10/1993 | Danielson et al. | 501/17 |
| 5,422,318 | 6/1995 | Hagg et al. | 501/4 |

*Primary Examiner*—Mark L. Bell
*Assistant Examiner*—Louis M. Troilo
*Attorney, Agent, or Firm*—Milton M. Peterson

[57] ABSTRACT

An ivory-colored, opaque glass-ceramic having a beta-spodumene solid solution as its primary crystal phase, and a method of controlling color in the glass-ceramic. The glass-ceramic is produced from a $Li_2O$—$Al_2O_3$—$SiO_2$ precursor glass containing 3-6% $TiO_2$+$ZrO_2$ as a nucleating agent and having colorants controlled at levels of up to 20 ppm $Co_3O_4$, up to 1000 ppm $Fe_2O_3$ and 1000–2000 ppm $CeO_2$.

9 Claims, 1 Drawing Sheet

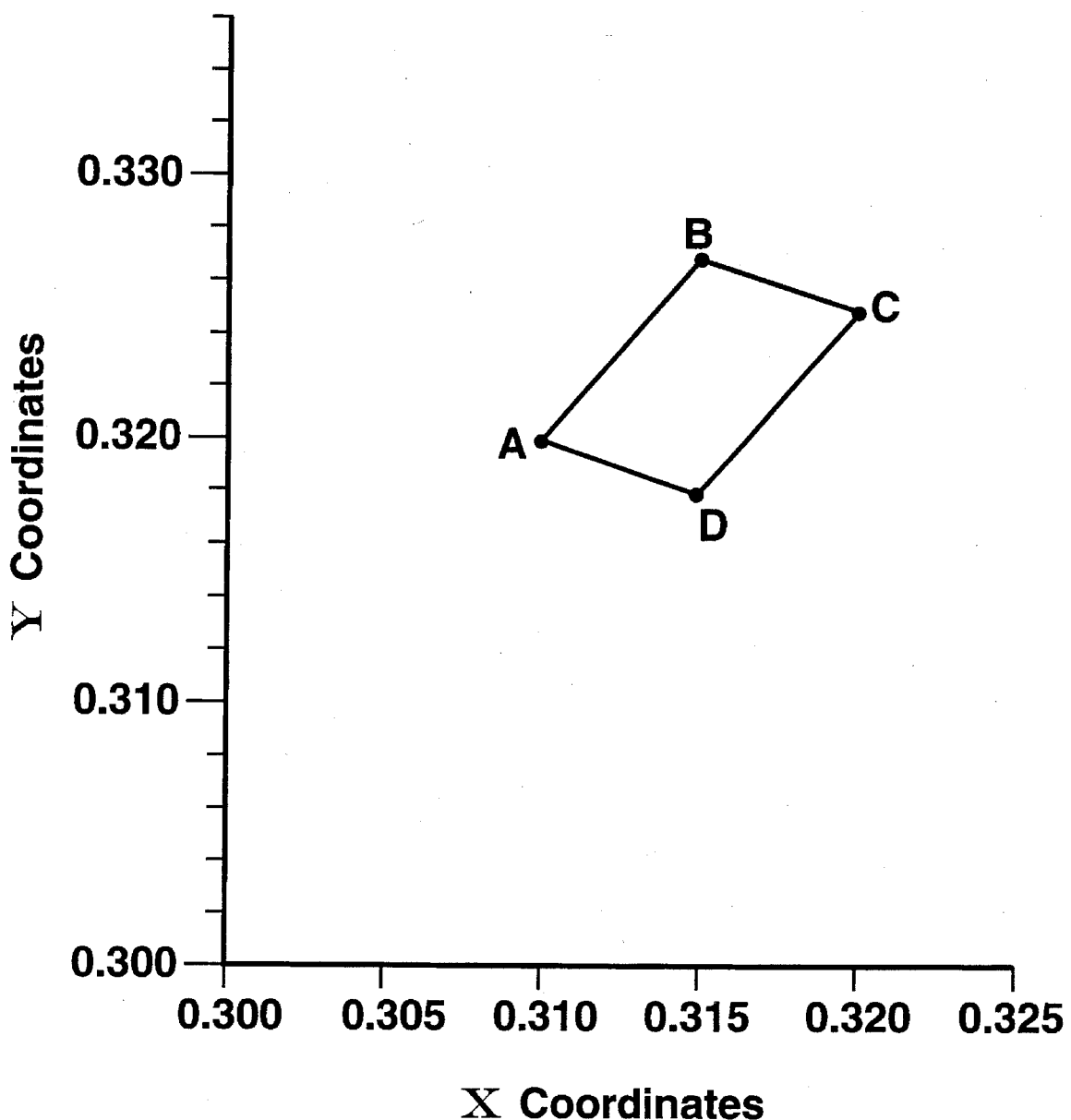

IVORY COLOR IN OPAQUE GLASS-CERAMIC

RELATED APPLICATION

U.S. application Ser. No. 08/299,354, now U.S. Pat. No. 5,455,207, was filed by S. L. Hagg under the title COLORED GLASS-CERAMICS AND METHOD and assigned to the same assignee as the present application. It is directed to an ivory-colored, opaque, glass-ceramic article having potassium fluorrichterite as a primary crystal phase, cristobalite as a secondary crystal phase, and a color package consisting of:

0.045–0.065% $Fe_2O_3$
0.015–0.035% NiO
2–8 ppm Se
0–0.0014% $Co_3O_4$.

FIELD OF THE INVENTION

The field is glass-ceramic materials and production of colors therein.

BACKGROUND OF THE INVENTION

A glass-ceramic is a material having at least one crystalline phase thermally developed in a uniform pattern throughout at least a portion of a glass precursor.

Glass-ceramics have been known for over 30 years since being described in U.S. Pat. No. 2,920,971 (Stookey). They find application in diverse areas, an area of particular interest being the fabrication of articles used in the preparation and serving of food. Such articles include cookware, bakeware, tableware and flat cooktops.

In general, production of a glass-ceramic material involves three major steps:

1. Melting a mixture of raw materials, usually containing a nucleating agent, to produce a glass.
2. Forming an article from the glass and cooling the glass below its transformation range.
3. Crystallizing ("ceramming") the glass article by an appropriate thermal treatment.

The thermal treatment usually involves a nucleating step at a temperature slightly above the transformation range. This is followed by heating to a somewhat higher temperature to cause crystal growth on the nuclei.

Crystallization of glasses in the $Li_2O$—$Al_2O_3$—$SiO_2$ composition field generally provides highly crystallized glass-ceramics. The primary crystal phase depends on glass composition and heat treatment. It may be a transparent beta-quartz solid solution, or an opaque beta-spodumene solid solution.

Beta-quartz and beta-spodumene solid solution glass-ceramics customarily contain $TiO_2$ as a nucleating agent. Optionally, the $TiO_2$ may be partially, or wholly, substituted for by $ZrO_2$. The appearance of such glass-ceramics can be varied by varying composition and/or heat treatment. Thus, transparent, translucem, or opaque glass-ceramics (which may be water-white, translucent, opaque white, or variously colored) are all possibilities as described in the prior art.

The widest use of $Li_2O$—$Al_2O_3$—$SiO_2$ glass-ceramic materials has been in the field of culinary ware. For over three decades, Corning Glass Works, now Corning Incorporated, has marketed opaque white cooking utensils under the trademark CORNING WARE. The $Li_2O$—$Al_2O_3$—$SiO_2$ glass-ceramic of this ware has a beta-spodumene crystal phase. In general, this opaque glass-ceramic is crystallized at higher temperatures, which may reach 1150° C., to develop large, beta-spodumene solid solution crystals that render the article opaque.

U.S. Pat. No. 3,157,522 (Stookey) discloses a family of glasses that may be crystallized to produce glass-ceramics having an opaque, beta-spodumene crystal phase. This family consists essentially, in percent by weight calculated on an oxide basis, of 55–75% $SiO_2$, 3–6% $TiO_2$, 2–6.5% $Li_2O$ and 12–36% $Al_2O_3$, the weight ratio $Li_2O$:$Al_2O_3$ being 0.1 to 0.6 and the essential ingredients totaling at least 95%. It has subsequently been learned that $ZrO_2$ may replace $TiO_2$, at least in part, as a nucleating agent.

U.S. Pat. No. 5,070,045 (Comte et al.) discloses transparent, glass-ceramic plates wherein the predominant crystal phase in the glass-ceramics is beta-quartz solid solution. These plates use 0.1–1.0% of a colorant selected from CoO, NiO, $Cr_2O_3$, $Fe_2O_3$, $MnO_2$, and $V_2O_5$. The patent is primarily concerned with $V_2O_5$ which contributes to minimal distortion while giving a black aspect in reflection and a reddish brown tint in transmission. The Comte et al. compositions consist essentially, in weight percent, as calculated on the oxide basis, of:

| | | | |
|---|---|---|---|
| $SiO_2$ | 65–70 | MgO + BaO + SrO | 1.1–2.3 |
| $Al_2O_3$ | 18–19.8 | $ZrO_2$ | 1.0–2.5 |
| $Li_2O$ | 2.5–3.8 | $As_2O_3$ | 0–1.5 |
| MgO | 0.55–1.5 | $Sb_2O_3$ | 0–1.5 |
| ZnO | 1.2–2.8 | $As_2O_3 + Sb_2O_3$ | 0.5–1.5 |
| $TiO_2$ | 1.8–3.2 | $Na_2O$ | 0–<1.0 |
| BaO | 0–1.4 | $K_2O$ | 0–<1.0 |
| SrO | 0–1.4 | $Na_2O + K_2O$ | 0–<1.0 |
| BaO + SrO | 0.4–1.4 | 2.8 $Li_2O$ + 1.2 ZnO 5.2 MgO | >1.8 |

The Comte et al. base glass has been found effective for use in producing both opaque and transparent, as well as colored and uncolored, glass-ceramic products from a single glass melting tank. In accomplishing this, a technique known as a forehearth coloring system, or a colorcell, is employed.

Use of that technique makes it possible to obtain products having different colors, as well as an opaque product, with a single base glass composition for the precursor glass. That facilitates changing from one product to another with a single melting unit. It is also possible to melt one precursor base glass, and then make subsequent additions in the furnace forehearth to achieve different colors.

U.S. Pat. No. 5,256,602 (Danielson et al.) describes a forehearth colorant for use in introducing vanadium oxide into a glass passing through a forehearth. As there noted, the base glass, without colorant, can be delivered through a separate forehearth.

The present invention achieves a specific decorative color in an opaque, beta-spodumene solid solution glass-ceramic. In particular, it provides an ivory color in beta-spodumene glass-ceramic ware. That color is compatible with the ivory color imparted to opaque, potassium fluorrichterite ware as described in the related Hagg application.

SUMMARY OF THE INVENTION

The article of the invention is an ivory-colored, opaque $Li_2O$—$Al_2O_3$—$SiO_2$ glass-ceramic having beta-spodumene as its primary crystal phase, and having a cerium oxide ($CeO_2$) content of 1000–2000 ppm $CeO_2$, and having a color defined by color coordinates, based on the CIE system (Illuminant C), of x=0.3100–0.3200, y= 0.3180–0.3270 and Cap Y=65–90.

The invention further resides in a method of controlling an ivory color in a glass-ceramic material having beta-spodumene solid solution as its predominant crystal phase, the method comprising controlling the $CeO_2$ level between 1000 ppm and 2000 ppm, the $Fe_2O_3$ level between 500 and 1000 ppm and the $Co_3O_4$ level at not over 20 ppm.

PRIOR ART

In addition to the patents mentioned in the Background section, attention is also directed to United States patents described in an accompanying document.

BRIEF DESCRIPTION OF THE DRAWING

The single FIGURE in the accompanying drawing is a graphical representation of chromaticity coordinates x and y (Illuminant C). The FIGURE further shows a color coordinate box defining the color achieved in accordance with the invention.

DESCRIPTION OF THE INVENTION

My invention is based in large measure on my discovery that a controlled ivory color can be imparted to an opaque beta-spodumene glass-ceramic. The precursor glass for a beta-spodumene glass-ceramic has a lithia aluminosilicate ($Li_2O$—$Al_2O_3$—$SiO_2$) base composition. Composition ranges for suitable lithia aluminosilicate glasses are set forth in Stookey U.S. Pat. No. 3,157,522, as indicated earlier.

The presence of lithia ($Li_2O$) and alumina ($Al_2O_3$), as well as silica ($SiO_2$), are essential in the precursor glass composition. These oxides produce the beta-spodumene crystal phase when the precursor glass is converted to a glass-ceramic (cerammed). Together with a nucleating agent, they will total at least about 95% of the precursor glass composition.

Iron oxide is normally present as an impurity in batch materials, particularly sand. It facilitates infra-red transmission, thereby providing retention and transfer of heat during glass melting. Accordingly, a level of 500–1000 ppm, preferably about 900 ppm, is maintained in the glass composition.

The patent prescribes up to 6% $TiO_2$ as a nucleating agent. It has since been learned that $ZrO_2$ can function as a nucleating agent. $TiO_2$ tends to impart color to the glass while $ZrO_2$ is difficult to melt. Accordingly, it is customary to employ as little as possible of both oxides in an amount totaling 3–6%.

Cobalt oxide is frequently present from cullet used in the glass batch. Up to about 20 ppm can normally be tolerated without noticeable effect on ultimate product color. The glass may also include 0.1–1.5% of arsenic or antimony oxide as a fining agent. Minor amounts, up to a total of about 5%, of divalent metal oxides (MgO, CaO, ZnO) may be present as property modifiers. Alkali metal oxides, other than $Li_2O$, are usually avoided since they may form undesired crystal phases.

The present invention was developed employing a base glass in accordance with the teachings of the Comte et al. -045 patent. Accordingly, my preferred base glasses have compositions falling within the ranges of that patent as set forth earlier.

The invention is based on my discovery that an ivory color can be obtained in a beta-spodumene glass-ceramic by incorporating cerium oxide ($CeO_2$) in the composition of the precursor base glass and controlling the level between 1000–2000 parts per million (ppm). This is equivalent to 0.0010–0.0020% by weight $CeO_2$. Larger additions of the oxide produce darker colors. Additions less than 1000 ppm are not readily distinguishable from the uncolored, opaque glass-ceramic. A $CeO_2$ content of about 1400 ppm is presently considered as being compatible with tableware produced in accordance with the teaching in the companion Hagg application.

In the accompanying drawing, the single FIGURE is a graphical representation of the invention employing the CIE chromaticity coordinate system. In the FIGURE, x coordinates are plotted on the horizontal axis and y coordinates are plotted on the vertical axis. The polygon ABCDA encompasses coordinate value combinations that provide generally acceptable colors in accordance with the invention. The color coordinate value ranges for this area are:

x=0.3100 to 0.3200 y=0.3180 to 0.3270

Y=65 to 90

The $CeO_2$ may be introduced by incorporating a suitable source in the batch fed to a melting unit. However, a real advantage is obtained by using a forehearth colorant additive system sometimes referred to as a colorcell.

The method and equipment used to add a colorant material to a molten glass in a forehearth are collectively referred to as a forehearth coloring system or a colorcell. Such systems (colorcells) have been in use for at least 30 years. They have been used primarily to impart colors to soda lime glasses, in particular, green or blue colors to soda lime glass bottles. Currently, colorcells are employed to introduce two types of glass colorants: unmelted concentrated colorant in particulate form and melted color frits. The former is favored in the United States, while the latter is more popular in Europe.

In development work, a commercial, bonded oxide material was used as a source of $CeO_2$ in an effort to simulate colorcell practice. This material had a composition consisting essentially of 52% $CeO_2$, 29.3% $SiO_2$, 11.1% $Na_2O$, 4.7% $B_2O_3$, 2.2% rare earth metal oxides and 0.1–0.2% each of $Al_2O_3$, $TiO_2$, CaO, $K_2O$ and $Fe_2O_3$. The material tends to produce light colors due to the soda and $B_2O_3$ introduced for flux purposes. To correct the loss, the amount of $CeO_2$ additive may be increased, or pellets that have a higher $CeO_2$ content and lower flux level may be used.

The glass product is then cerammed, that is, heat treated to produce the desired glass-ceramic product. A typical schedule for the present beta-spodumene, colored product is:

1. Raise furnace temperature to 800° C. at 300° C./hour.
2. Hold between 800° C. and 850° C. for 30 minutes.
3. Raise to 1140°–1150° C. at 300° C./hour.
4. Hold for 45–60 minutes.
5. Cool at furnace rate to ambient.

In studying the effects of $CeO_2$ as a colorant in beta-spodumene glass-ceramics, a base glass was employed having the following composition, as calculated in weight percent on the oxide basis:

| | | | |
|---|---|---|---|
| $SiO_2$ | 68.4 | $TiO_2$ | 2.6 |
| $Al_2O_3$ | 19.5 | $ZrO_2$ | 1.7 |
| $Li_2O$ | 3.5 | $As_2O_3$ | 0.6 |
| MgO | 1.2 | $Fe_2O_3$ | 900 ppm |
| ZnO | 1.6 | $Co_3O_4$ | 20 ppm |
| BaO | 0.8 | | |

Initially, a series of crucible melts were made. The batch for each melt was derived from the base glass plus an addition of $CeO_2$. The $CeO_2$ additions were in increments from zero to 2000 ppm and were made with the bonded oxide described earlier. This provided seven melts with $CeO_2$ contents and color coordinates as follows:

TABLE 1

|         | 1      | 2      | 3      | 4      | 5      | 6      | 7      |
|---------|--------|--------|--------|--------|--------|--------|--------|
| $CeO_2$ | —      | 500    | 750    | 1000   | 1250   | 1500   | 2000   |
| Cap Y   | 78.7   | 78.3   | 75.9   | 77.2   | 75.9   | 77.0   | 76.5   |
| x       | 0.3126 | 0.3134 | 0.3139 | 0.3150 | 0.3160 | 0.3163 | 0.3174 |
| y       | 0.3178 | 0.3191 | 0.3195 | 0.3206 | 0.3213 | 0.3217 | 0.3235 |

Each batch weighed 1000 grams and was melted in a platinum crucible for 16 hours at 1650° C. A single patty was poured from each melt. The patties were cerammed in gas-fired, production tunnel kilns for determination of color properties.

The color properties, in terms of x and y coordinates in accordance with the CIE system, are shown in TABLE I.

Based on these melts, a trial was scheduled in a commercial melting unit. This unit had a forehearth equipped to make colorcell additions of the bonded oxide, $CeO_2$ colorant. Additions were varied to provide a range of colors. The additions provided $CeO_2$ contents in the range of 1000–3000 ppm in the glass.

Samples were taken periodically for color and $CeO_2$ measurements. $CeO_2$ contents were measured by x-ray fluorescence. Color coordinates were measured by standard optical procedures. Measurements were made at three different locations on each sample and the results averaged to provide representative values.

TABLE II below shows representative average measurements made on samples taken during the run.

TABLE II

| Ex. | $CeO_2$ (ppm) | Y    | x      | y      |
|-----|---------------|------|--------|--------|
| 8   | 963           | 78.2 | 0.3147 | 0.3205 |
| 9   | 1051          | 77.6 | 0.3160 | 0.3215 |
| 10  | 1501          | 78.0 | 0.3153 | 0.3215 |
| 11  | 1881          | 76.5 | 0.3173 | 0.3232 |
| 12  | 2933          |      |        |        |
| 13  | 3043          | 76.4 | 0.3177 | 0.3236 |

The single FIGURE in the accompanying drawing employs the CIE chromaticity coordinate system based on x and y coordinates to graphically represent the invention. x coordinates are plotted on the horizontal axis and y coordinates on the vertical axis. The rectangle ABCDA encompasses coordinate value combinations that provide generally acceptable colors in accordance with the invention. The color coordinate value ranges for this area are:

x=0.3100–0.3200 y=0.3180–0.3270.

The x and y coordinate values for the points on the rectangle ABCDA are:

|   | x      | y      |
|---|--------|--------|
| A | 0.3100 | 0.3200 |
| B | 0.3150 | 0.3270 |
| C | 0.3200 | 0.3250 |
| D | 0.3150 | 0.3180 |

I claim:

1. An ivory-colored, opaque, $Li_2O$—$Al_2O_3$—$SiO_2$ glass-ceramic having beta-spodumene as its primary crystal phase, having a $CeO_2$ content of 1000–2000 ppm, and having color coordinates, based on the CIE system (Illuminant C) of x=0.3100–0.3200, y=0.3180–0.3270 and Y=65–90.

2. A glass-ceramic in accordance with claim 1 wherein the glass-ceramic consists essentially of, as calculated in weight percent on an oxide basis:

| $SiO_2$           | 55–75%   |
| $Al_2O_3$         | 12–36%   |
| $Li_2O$           | 2–6.5%   |
| $TiO_2 + ZrO_2$   | 3–6%     |
| $Li_2O:Al_2O_3$   | 0.1–0.6  | the essential ingredients totaling at least 95%.

3. A glass-ceramic in accordance with claim 1 wherein the glass-ceramic consists essentially of, as calculated in weight percent on an oxide basis:

| $SiO_2$   | 65–70   | SrO               | 0–1.4         |
| $Al_2O_3$ | 18–19.8 | BaO + SrO         | 0.4–1.4       |
| $Li_2O$   | 2.5–3.8 | $As_2O_3$         | 0–1.5         |
| MgO       | 0.5–1.5 | $Sb_2O_3$         | 0–1.5         |
| ZnO       | 1.2–2.8 | $As_2O_3 + Sb_2O_3$ | 0.5–1.5     |
| $TiO_2$   | 1.8–3.2 | $Na_2O + K_2O$    | 0–<1.0        |
| $ZrO_2$   | 1.0–2.5 | $CeO_2$           | 1000–2000 ppm |
| BaO       | 0–1.4   | $Co_3O_4$         | 0–20 ppm      |
|           |         | $Fe_2O_3$         | 500–1000 ppm  |

4. A glass-ceramic in accordance with claim 3 consisting of, as calculated in approximate weight percent on an oxide basis:

| $SiO_2$   | 68.4 | $ZrO_2$    | 1.7       |
| $Al_2O_3$ | 19.5 | BaO        | 0.8       |
| $Li_2O$   | 3.5  | $As_2O_3$  | 0.6       |
| MgO       | 1.2  | $Co_3O_4$  | 10–20 ppm |
| ZnO       | 1.6  | $Fe_2O_3$  | 900 ppm   |
| $TiO_2$   | 2.6  | $CeO_2$    | 1400 ppm. |

5. A method of producing an ivory color in a glass-ceramic material having beta-spodumene solid solution as its predominant crystal phase, the method comprising melting a mixture of raw materials containing between 1000 ppm and 2000 ppm of $CeO_2$ in the precursor glass, forming an article from the glass, cooling the glass below its transformation range, and subsequently crystallizing the glass article by a thermal treatment step.

6. A method in accordance with claim 5 which further comprises producing color added to a precursor $Li_2O$—$Al_2O_3$—$SiO_2$ glass as follows:

by adding the $CeO_2$ colorant to a precursor glass having a base composition consisting essentially of, as calculated on an oxide basis in weight percent:

| | |
|---|---|
| $SiO_2$ | 55–75% |
| $Al_2O_3$ | 12–36% |
| $Li_2O$ | 2–6.5% |
| $TiO_2 + ZrO_2$ | 3–6% |
| $Li_2O:Al_2O_3$ | 0.1–0.6 | the essential ingredients totaling at least 95%.

7. A method in accordance with claim 6 wherein the thermal treatment step comprises heating the glass to a temperature of about 800° C., holding at 800°–850° C., heating to 1140°–1150° C. and holding at that temperature to develop a beta-spodumene crystal phase having an ivory color.

8. A method in accordance with claim 6 which further comprises adding at least a portion of the $CeO_2$ content to the molten glass as it passes through a forehearth.

9. A method in accordance with claim 5 which further comprises providing a level of $Fe_2O_3$ content in the precursor glass between 500 and 1000 ppm to facilitate heat transfer during melting of the glass.

\* \* \* \* \*